(12) United States Patent
McGehee et al.

(10) Patent No.: US 11,313,751 B1
(45) Date of Patent: Apr. 26, 2022

(54) LEAK DETECTION AND CONTAINMENT DEVICE

(71) Applicants: Daniel E. McGehee, Kyle, TX (US); Eric J. McGehee, Kyle, TX (US)

(72) Inventors: Daniel E. McGehee, Kyle, TX (US); Eric J. McGehee, Kyle, TX (US)

( * ) Notice: Subject to any disclaimer, the term of this patent is extended or adjusted under 35 U.S.C. 154(b) by 0 days.

(21) Appl. No.: 16/895,389

(22) Filed: Jun. 8, 2020

Related U.S. Application Data (60) Provisional application No. 62/857,889, filed on Jun. 6, 2019.

(51) Int. Cl.
*G01M 3/16* (2006.01)
*G08B 25/10* (2006.01)
*G08B 7/06* (2006.01)

(52) U.S. Cl.
CPC ............... *G01M 3/16* (2013.01); *G08B 7/06* (2013.01); *G08B 25/10* (2013.01)

(58) Field of Classification Search
CPC ............ G08B 7/06; G08B 25/10; G01M 3/16
See application file for complete search history.

(56) References Cited

U.S. PATENT DOCUMENTS

| | | |
|---|---|---|
| 5,188,143 A | 2/1993 | Krebs |
| 5,192,932 A | 3/1993 | Schwab, Jr. |
| 5,339,676 A | 8/1994 | Johnson |
| 5,939,619 A * | 8/1999 | Achter ............... G01M 3/229 73/40.7 |
| 6,175,310 B1 | 1/2001 | Gott |
| 6,639,517 B1 | 10/2003 | Chapman et al. |
| 7,082,959 B1 | 8/2006 | Franklin |
| 7,124,772 B1 | 10/2006 | Browning |
| 7,605,710 B2 * | 10/2009 | Crnkovich ............ A61F 13/42 340/603 |
| 7,948,388 B2 | 5/2011 | McGinty et al. |
| 7,956,760 B2 | 6/2011 | Hill |
| 9,233,030 B1 | 1/2016 | Kennedy |
| 2010/0060690 A1 * | 3/2010 | Hosokawa ........... B41J 2/04588 347/14 |
| 2015/0084614 A1 * | 3/2015 | Alatainio ............... G01N 27/61 324/71.1 |
| 2017/0077186 A1 * | 3/2017 | Tallal ................... H01L 27/307 |

* cited by examiner

*Primary Examiner* — Ojiako K Nwugo
(74) *Attorney, Agent, or Firm* — Cramer Patent & Design, PLLC; Aaron R. Cramer (57) ABSTRACT

A leak detection and containment tray includes a solid bottom surface and perforated upper surface and a pair of metal plates separated by a unit of absorbent material that is conductive when wet. When the tray absorbs a liquid, an electrical connection is completed between the pair of metal plates thereby causing an audible alarm. An illumination device is also provided and illuminated when the electrical connection is completed. A switch is configured to permit selective use of the audio and/or visual alarm.

20 Claims, 6 Drawing Sheets

FIG. 6

LEAK DETECTION AND CONTAINMENT DEVICE

RELATED APPLICATIONS

The present invention was first described in and claims the benefit of U.S. Provisional Patent Application No. 62/857,889 filed on Jun. 6, 2019 the entire disclosures of which are incorporated herein by reference.

FIELD OF THE INVENTION

The present invention relates generally to the field of leak detection and more specifically to a leak detector and containment device.

BACKGROUND OF THE INVENTION

There is perhaps no greater household disaster than water damage. Not only do the physical portions of the house such as walls, woodwork, drywall, carpeting, and the like get ruined, but personal belongings such as furniture, appliances and the like get destroyed as well. While water damage due to rain or flooded rivers is out of our control, those that result from leaking plumbing underneath sinks certainly something that should be controllable.

However, the problem is usually not in fixing the leak, but simply in becoming aware of it in the first place. Slow, systematic drips will work their way around sink cabinet contents, through bottom surfaces, onto the floor and down into lower floors of a structure for hours, days, or even weeks before it is noticed. During this time, a small nuisance can turn into major structural damage which becomes a major expense to repair and correct. Accordingly, there exists a need for a means by which water leaks under a sink can be monitored and alarmed to avoid the problems as described above. The development of the water leak containment and detection alerting device fulfills this need.

SUMMARY OF THE INVENTION

To achieve the above and other objectives, the present invention provides for a water leak containment and detection alerting device which comprises a tray assembly, an electronics housing which has a face plate with a control switch, an indicator light, and an annunciator. The electronics housing is in electrical communication with the tray assembly. The water leak containment and detection alerting device also comprises a protective insert which has a plurality of apertures which are disposed on an interior of a waterproof pan and a user-replaceable battery powering the water leak containment and detection alerting device. The user-replaceable battery is disposed in an interior of the pan with a first electrode disposed at the bottom of the pan. The water leak containment and detection alerting device also comprises an indicator light and an annunciator providing one or more visual and audible warnings respectively with a plurality of unwanted water in the interior of the pan and a grille which is disposed on the face plate. The grille is aligned with the annunciator. The water leak containment and detection alerting device also comprises a control switch which has a three-position switch, a radio frequency connection generated by a plurality of internal components of the water leak containment and detection alerting device, an insulator which has the same dimensions as the first electrode and a second electrode which has a plurality of apertures to allow the unwanted water to infiltrate to the insulator underneath the second electrode. The second electrode has the same dimensions as the first electrode. A plurality of individual conductors are electrically connected to the first electrode and the second electrode via electrical connection.

The tray assembly may be a rubber or plastic waterproof tray. The electronic communication between the electronics housing and the tray assembly may be a two-conductor cable whose length may vary based upon the needs of the water leak containment and detection alerting device. The protective insert apertures may align directly with the apertures of the second electrode to allow any falling water to pass through. The pan may include the first electrode which is disposed on the bottom of the pan. The first electrode may be a solid conductive metal plate. The solid conductive metal plate may be made of material selected from the group consisting of steel, aluminum, copper, or brass. The first electrode may be smaller than the bottom of the pan. The first electrode may be ¼ in. smaller than the bottom of the pan.

The three-position switch allows a user to select between an OFF position, an AUDIO AND VISUAL ALERT position, or a VISUAL ALERT position. The radio frequency connection may be used by a wireless device to provide indication of the unwanted water in the pan. The wireless device may provide remote indication of the water leak containment and detection alerting device in the immediate area of the water leak containment and detection alerting device. The wireless device may be selected from the group consisting of a personal mobile telephone, a personal computer, a tablet computer, or a key fob. The wireless device may provide remote indication of the water leak containment and detection alerting device anywhere in the world. The radio frequency connection may utilize a connection technology which is selected from the group consisting of Bluetooth technology, Wi-Fi technology, cellular technology, proprietary technology, 433 MHz technology, 902-928 MHz technology, or 2.4 GHz technology.

The insulator may be made of porous and non-conductive material. The insulator may also be made of nylon mesh that would absorb, hold the unwanted water, and dry quickly. The second electrode may be a solid conductive metal plate. The solid conductive metal plate may be made of material selected from the group consisting of steel, aluminum, copper, or brass.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 water leak containment and detection alerting device
15 tray assembly
20 electronics housing
21 face plate
30 protective insert
35 apertures
40 pan
50 control switch
51 OFF position
52 AUDIO AND VISUAL ALERT position
53 VISUAL ALERT position
55 indicator light
60 annunciator
61 grille
65 battery
70 radio frequency (RF) connection
75 wireless device
80 first electrode
85 insulator
90 second electrode
95 placement path 'p'
100 individual conductor
105 electrical connection
110 area of potential water leakage
115 under sink storage item
120 potential water leak source
125 control circuit
130 transmitter circuit
135 transmitting antenna 1. Description of the Invention The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Figure 1:
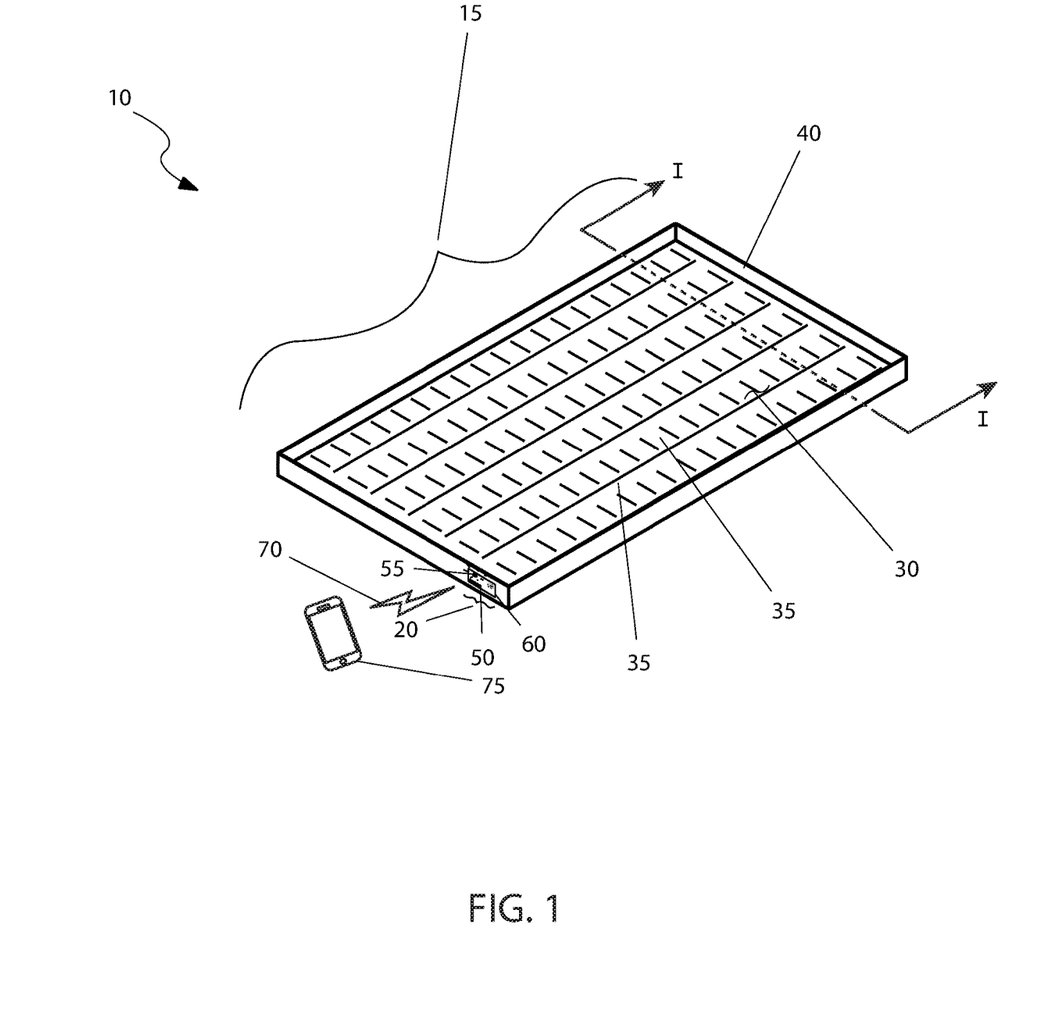
FIG. 1 is a perspective view of the water leak containment and detection alerting device 10, according to the preferred embodiment of the present invention.

Referring now to FIG. 1, a perspective view of the water leak containment and detection alerting device 10, according to the preferred embodiment of the present invention is disclosed. The water leak containment and detection alerting device (herein also described as the "device") 10, generally has two (2) major components: a tray assembly 15 and an electronics housing 20 in electrical communication with features of the tray assembly 15. The tray assembly 15 is envisioned to be a rubber or plastic waterproof tray. It is noted that the dimensions of the tray assembly 15 are not intended to be a limiting factor of the present invention. However, a typical unit is envisioned to be approximately eighteen inches (18 in.) long, twelve inches (12 in.) wide, and approximately one inch (1 in.) deep. A protective insert 30 with a plurality of apertures 35 is visible on the interior of a waterproof pan 40. Additional description on the interior construction and operation of the tray assembly 15 will be provided hereinbelow.

Figure 5:
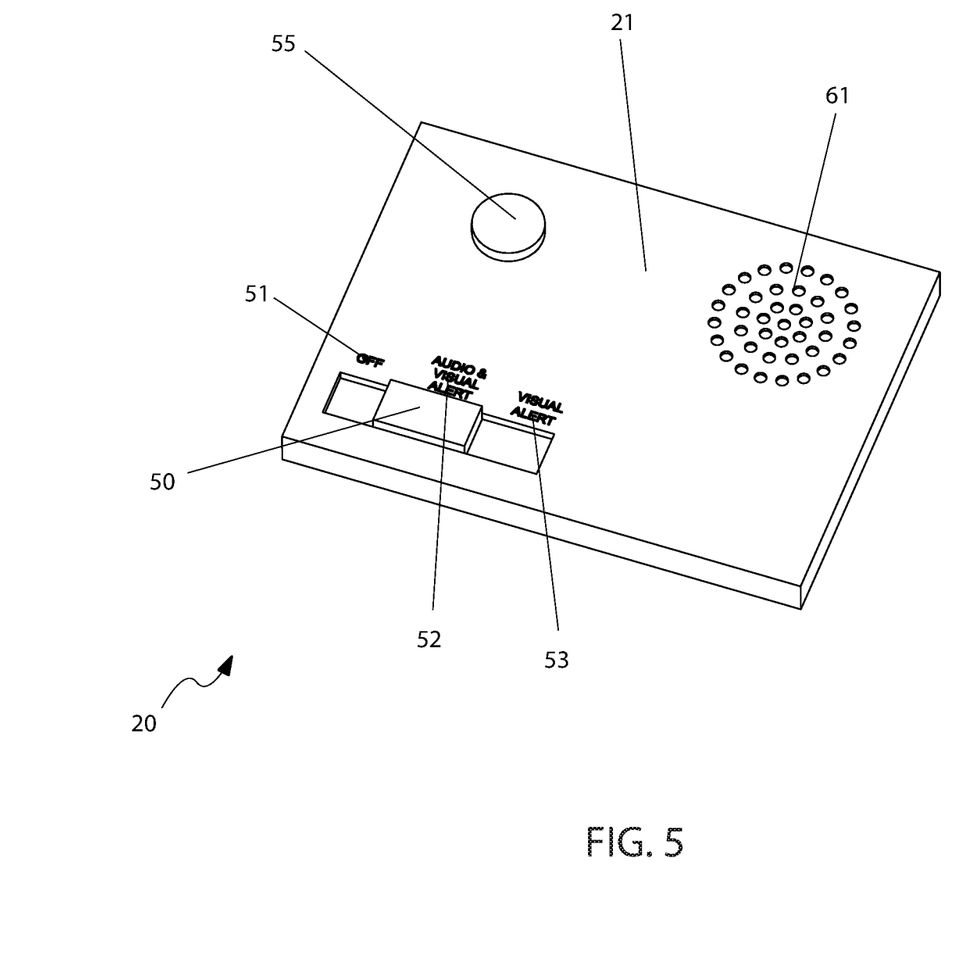
FIG. 5 is a close-up view of the electronics housing 20, according to the preferred embodiment of the present invention; and, FIG. 6 is an electrical block diagram of the water leak containment and detection alerting device 10, according to the preferred embodiment of the present invention.

Referring more clearly now to FIG. 5, the electronics housing 20 includes a face plate 21 having a control switch 50, an indicator light 55 and an annunciator 60. The electronics housing 20 is mounted to a sidewall of the pan 40, preferably so the face plate 21 is flush with the outer surface thereof. The device 10 is powered by a user-replaceable battery 65 (not shown) on the interior of the pan 40. The indicator light 55 and annunciator 60 provide visual and audible warnings respectively of the presence of unwanted water in the interior of the pan 40. A grille 61 is located on the face plate 21 and aligned with the annunciator 60. The control switch 50 is preferably a three-position switch providing a user the ability to select between an OFF position 51, an AUDIO AND VISUAL ALERT position 52, or a VISUAL ALERT position 53. Additionally, a radio frequency (RF) connection 70 is generated by internal components of the device 10 and is used by a wireless device 75 to provide indication of unwanted water in the pan 40. It is envisioned that the radio frequency (RF) connection 70 would utilize Bluetooth® technology, although other protocols including but not limited to Wi-Fi, cellular, proprietary, four hundred thirty-three megahertz (433 MHz), nine hundred two to nine hundred twenty-eight megahertz (902-928 MHz), and/or two-point-four gigahertz (2.4 GHz). As such, the exact protocol of the radio frequency (RF) connection 70 is not intended to be a limiting factor of the present invention. Likewise, the wireless device 75 is envisioned to be a personal mobile telephone' however, other devices including, but not limited to: a personal computer, a tablet computer, a key fob, or the like may also be used, and as such, the exact configuration of the wireless device 75 is not intended to be a limiting factor of the present invention. It is therefore summarized that the wireless device 75 will provide remote indication of the device 10 whether in the immediate area of the device 10 or anywhere in the world.

Figure 2:
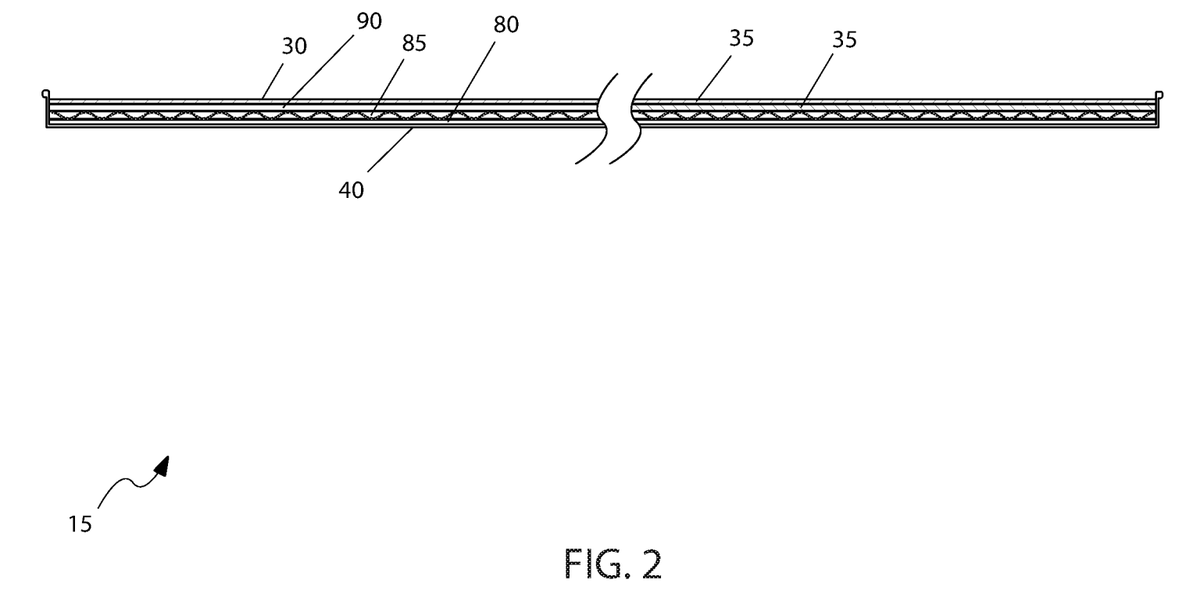
FIG. 2 is a sectional view of the water leak containment and detection alerting device 10, as seen along a line I-I, as shown in FIG. 1, according to the preferred embodiment of the present invention.

Referring next to FIG. 2, a sectional view of the device 10, as seen along a line I-I, as shown in FIG. 1, according to the preferred embodiment of the present invention is depicted. This view describes the components inside of the pan 40. At the bottom of the pan 40 is a first electrode 80. The first electrode 80 is envisioned as a solid conductive metal plate such as steel, aluminum, copper, brass, or the like. Its overall dimensions are just marginally smaller than that of the bottom of the pan 40, ideally approximately one-quarter of an inch (¼ in.) less. The next upward component is that of an insulator 85. The insulator 85 is the same dimensions as that of the first electrode 80 and would be made of porous, non-conductive material such as a nylon mesh that would absorb and hold water, but dry quickly. The next upward component is that of a second electrode 90, with the same dimension as that of the first electrode 80. It too would be made of a metal plate such as steel, aluminum, copper, brass, or the like, but would be provided with a plurality of apertures 35 to allow water to infiltrate to the insulator 85 and second electrode 90. The uppermost layer is that of the protective insert 30 with a plurality of apertures 35 that align directly with the apertures 35 of the second electrode 90 to allow any falling water to pass through to the lower components as described above.

Figure 3:
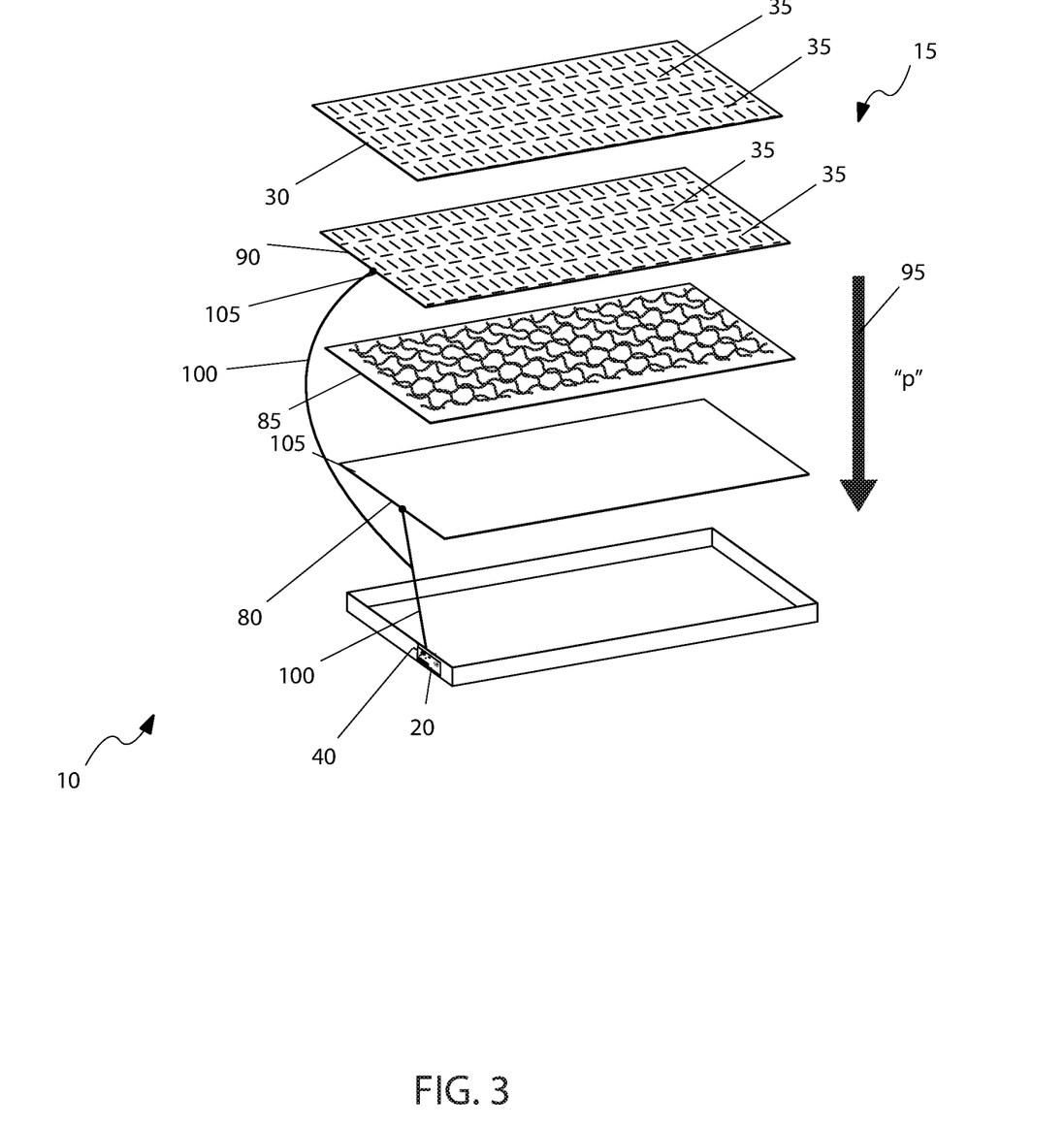
FIG. 3 is an exploded view of the water leak containment and detection alerting device 10, according to the preferred embodiment of the present invention.

Referring now to FIG. 3, an exploded view of the device 10, according to the preferred embodiment of the present invention is shown. This view discloses the first electrode 80, the insulator 85, the second electrode 90, and the protective insert 30 in a separated state prior to being assembled along a placement path 'p' 95 into the confines of a pan 40. The electronic communication between the electronics housing 20 and the tray assembly 15 is preferably a two-conductor cable whose length may vary based upon the needs of the particular installation in which the device 10 is utilized. Individual conductors 100 are electrically connected to the first electrode 80 and the second electrode 90 via electrical connection 105 as shown. Further detail on the circuiting arrangement utilized with the electronics housing 20 will be provided herein below. The electrical connections 105 are envisioned to be screws and nuts, terminals, solder, brazing, or the like, depending on the material of construction of the first electrode 80 and second electrode 90.

Figure 4:
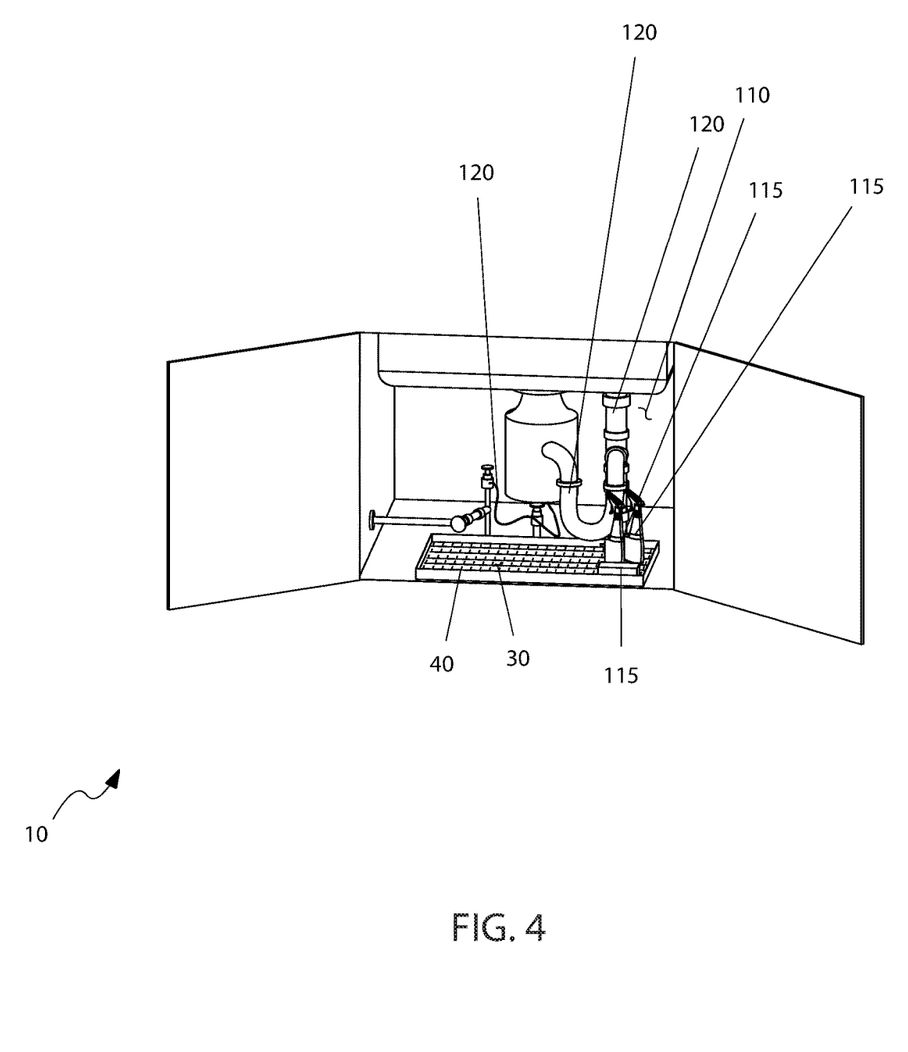
FIG. 4 is a perspective view of the water leak containment and detection alerting device 10, shown in a utilized state, according to the preferred embodiment of the present invention.

Referring next to FIG. 4, a perspective view of the device 10, shown in a utilized state, according to the preferred embodiment of the present invention is disclosed. The pan 40 with its interior components and the electronics housing 20 is placed in an area of potential water leakage 110, here depicted as under a kitchen sink. Other areas of potential water leakage 110 include, but are not limited to: under bathroom sinks, under utility sinks, under water heaters, under dishwashers, or under washing machines. Due to its wide and varied useful applications, the area of potential water leakage 110 used with the device 10 is not intended to be a limiting factor of the present invention. In this particular application under a kitchen sink, various under sink storage items 115 can be placed in the pan 40, atop the protective insert 30. This allows utilization of valuable under sink storage areas but retains the water containment and detection alerting properties of the device 10 from potential water leak sources 120 such as piping, valves, couplings, and the like. In a similar manner, should the device 10 be used with appliances such as water heaters, dishwashers, washing machines, or the like, said appliances can be directly located atop the protective insert 30 as well.

Figure 6:
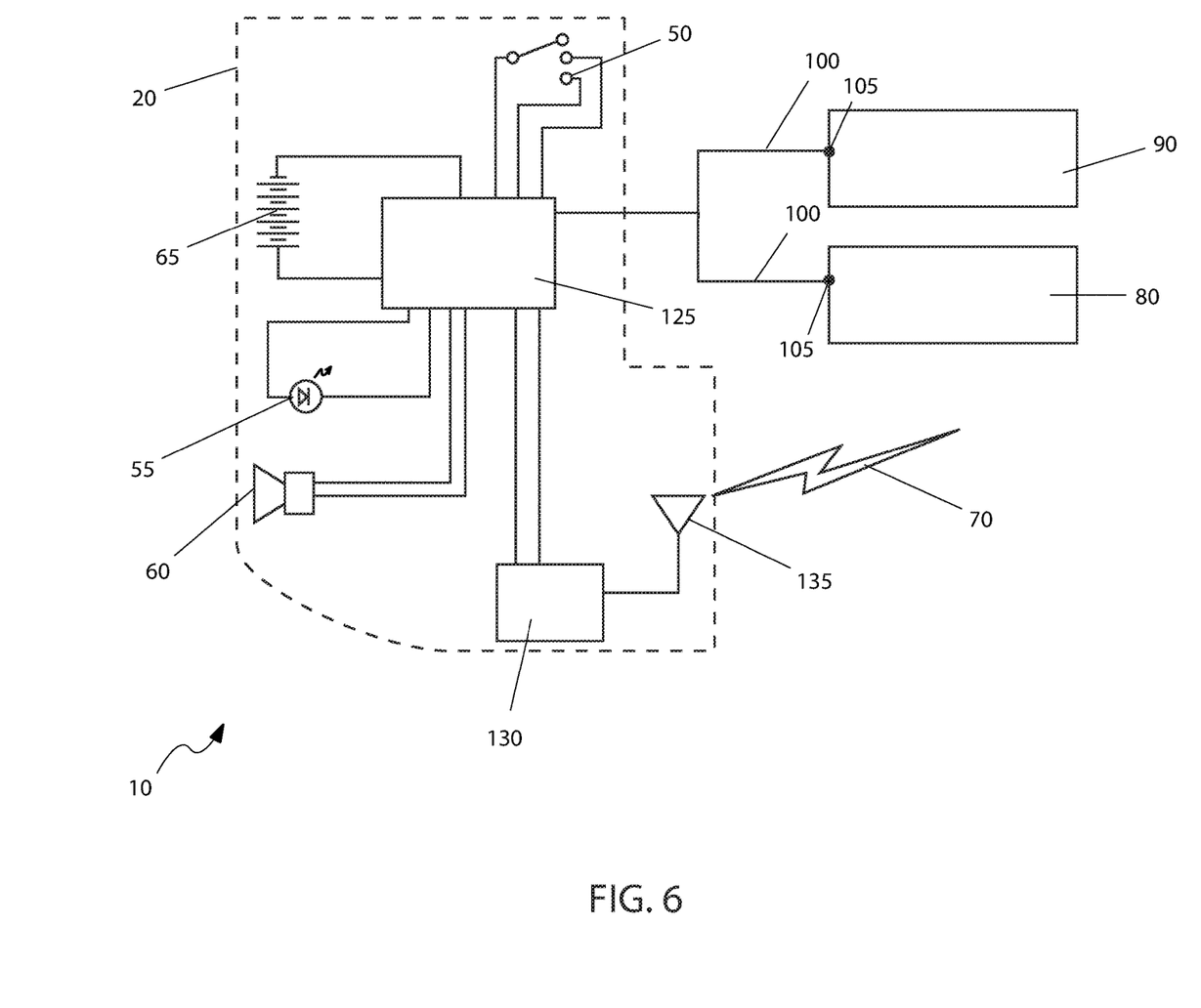

Referring to FIG. 6, an electrical block diagram of the device 10, according to the preferred embodiment of the present invention is depicted. Power for the device 10 is provided by a battery 65, located internal to the electronics housing 20, which connects to a control circuit 125 comprised of either discrete logic or a Single Board Computer (SBC) such as an Arduino®, Raspberry Pi® or the like. The exact method of establishing the logic behind operation of the device 10 is not intended to be a limiting factor of the present invention. Conductance signals between the first electrode 80 and second electrode 90 are carried on the individual conductors 100 to the control circuit 125 as an input. The control switch 50 allows for selection of an OFF position 51, an AUDIO AND VISUAL ALERT position 52, or a VISUAL ALERT position 53 also as an input to the control circuit 125. Outputs are provided by the indicator light 55 and the annunciator 60. It is envisioned that the annunciator 60 will provide an audible "chirp" at thirty second (30 sec.) intervals to conserve battery life. A transmitter circuit 130 and a transmitting antenna 135 provide for the generation of the radio frequency (RF) connection 70 as aforementioned described.

3. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 6. The user would procure the device 10 from conventional procurement channels such as home improvement stores, plumbing supply houses, discount stores, mail and internet sources or the like. Special attention would be paid to the overall size of the pan 40 as used with the device 10 as well as to any specialized applications such as use under a water heater or the like.

After procurement and prior to utilization, the device 10 would be prepared in the following manner: a battery 65 would be placed in the electronics housing 20; synchronization (pairing) with a wireless device 75 (if used) would be performed; and overall operation of the device 10 tested and verified. Next, the pan 40 would be placed in an area of potential water leakage 110. Any under sink storage items 115 could be placed on top in the case of under sink utilization; the control switch 50 would be placed in the AUDIO AND VISUAL ALERT 52, or the VISUAL ALERT position 53 depending on desired alarm transmission based on the mode of operation. At this point in time, the device 10 is ready for utilization.

During utilization of the device 10, the following procedure would be initiated: under normal usage without the presence of water leakage, no action is performed or necessary. Such usage may continue for months or years without change. However, upon the presence of water from a potential water leak sources 120, said water will contact the protective insert 30, penetrate through the protective insert 30 via its apertures 35, contact the second electrode 90, penetrate the second electrode 90 via its apertures 35, penetrate the porous insulator 85 and contact the first electrode 80, thus providing a signal path for the control circuit 125 to transmit the alarm. The alarm transmission would alert nearby occupants to the pending problem allowing for corrective action to occur.

After use of the device 10, it is allowed to dry, either as a unit, or separated (as shown in FIG. 3) to allow for faster drying. The device 10 is then reconstructed as shown in FIG. 1 and put into service as described above in a circular manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A water leak containment and detection alerting device, comprising:
   a tray assembly comprising;
      an electronics housing having a face plate with a control switch, an indicator light, and an annunciator, the electronics housing is in electrical communication with the tray assembly;

a protective insert having a plurality of apertures disposed on an interior of a waterproof pan;

a user-replaceable battery powering the water leak containment and detection alerting device, the user-replaceable battery is disposed in an interior of the pan with a first electrode disposed at the bottom of the pan;

a grille disposed on the face plate, the grille is aligned with the annunciator;

a control switch having a three-position switch;

a radio frequency connection generated by a plurality of internal components of the water leak containment and detection alerting device;

an insulator having the same dimensions as the first electrode; and a second electrode having a plurality of apertures to allow the unwanted water to infiltrate to the insulator underneath the second electrode, the second electrode having the same dimensions as the first electrode;

wherein the indicator light and the annunciator provide one or more visual and audible warnings respectively with a plurality of unwanted water in the interior of the pan; and, wherein a plurality of individual conductors are electrically connected to the first electrode and the second electrode via electrical connection.

2. The water leak containment and detection alerting device, according to claim 1, wherein the tray assembly is a rubber waterproof tray.

3. The water leak containment and detection alerting device, according to claim 1, wherein the tray assembly is a plastic waterproof tray.

4. The water leak containment and detection alerting device, according to claim 1, wherein the electronic communication between the electronics housing and the tray assembly is a two-conductor cable whose length may vary based upon the needs of the water leak containment and detection alerting device.

5. The water leak containment and detection alerting device, according to claim 1, wherein the protective insert apertures align directly with the apertures of the second electrode to allow any falling water to pass through.

6. The water leak containment and detection alerting device, according to claim 1, wherein the pan includes the first electrode disposed on the bottom of the pan.

7. The water leak containment and detection alerting device, according to claim 6, wherein the first electrode is a solid conductive metal plate.

8. The water leak containment and detection alerting device, according to claim 6, wherein a solid conductive metal plate is made of material selected from the group consisting of steel, aluminum, copper, or brass.

9. The water leak containment and detection alerting device, according to claim 1, wherein the first electrode is smaller than the bottom of the pan.

10. The water leak containment and detection alerting device, according to claim 9, wherein the first electrode is ¼ in. smaller than the bottom of the pan.

11. The water leak containment and detection alerting device, according to claim 1, the three-position switch allows a user to select between an OFF position, an AUDIO AND VISUAL ALERT position, or a VISUAL ALERT position.

12. The water leak containment and detection alerting device, according to claim 1, wherein the radio frequency connection is used by a wireless device to provide indication of the unwanted water in the pan.

13. The water leak containment and detection alerting device, according to claim 12, wherein the wireless device provides remote indication of the water leak containment and detection alerting device in the immediate area of the water leak containment and detection alerting device.

14. The water leak containment and detection alerting device, according to claim 12, wherein the wireless device may be selected from the group consisting of a personal mobile telephone, a personal computer, a tablet computer, or a key fob.

15. The water leak containment and detection alerting device, according to claim 1, wherein the wireless device provides remote indication of the water leak containment and detection alerting device anywhere in the world.

16. The water leak containment and detection alerting device, according to claim 1, wherein the radio frequency connection utilizes a connection technology selected from the group consisting of Bluetooth technology, Wi-Fi technology, cellular technology, proprietary technology, 433 MHz technology, 902-928 MHz technology, or 2.4 GHz technology.

17. The water leak containment and detection alerting device, according to claim 1, wherein the insulator is made of porous and non-conductive material.

18. The water leak containment and detection alerting device, according to claim 17, wherein the insulator is made of nylon mesh that would absorb, hold the unwanted water, and dry quickly.

19. The water leak containment and detection alerting device, according to claim 1, wherein the second electrode is a solid conductive metal plate.

20. The water leak containment and detection alerting device, according to claim 19, wherein the solid conductive metal plate is made of material selected from the group consisting of steel, aluminum, copper, or brass.

* * * * *